(12) United States Patent
Bergman

(10) Patent No.: US 8,215,075 B2
(45) Date of Patent: Jul. 10, 2012

(54) UP-TIGHT SURFACE COVERING AND ATTACHMENT SYSTEM

(75) Inventor: Todd M. Bergman, Lititz, PA (US)

(73) Assignee: AWI Licensing Company, Wilmington, DE (US)

( * ) Notice: Subject to any disclaimer, the term of this patent is extended or adjusted under 35 U.S.C. 154(b) by 156 days.

(21) Appl. No.: 12/335,618

(22) Filed: Dec. 16, 2008

(65) Prior Publication Data

US 2009/0235603 A1    Sep. 24, 2009

Related U.S. Application Data

(60) Provisional application No. 61/069,866, filed on Mar. 18, 2008.

(51) Int. Cl.
*E04B 2/00* (2006.01)
(52) U.S. Cl. ............... 52/506.07; 52/220.6; 52/506.01; 52/506.05; 52/506.08; 248/324
(58) Field of Classification Search ............ 52/220.6, 52/506.01, 506.05, 506.06, 506.07, 506.08, 52/512, 509; 248/317, 323, 324
See application file for complete search history.

(56) References Cited

U.S. PATENT DOCUMENTS

| | | | | |
|---|---|---|---|---|
| 1,692,571 A | * | 11/1928 | Rein | 52/99 |
| 2,736,528 A | * | 2/1956 | Le Brock | 248/317 |
| 2,866,233 A | * | 12/1958 | Lydard | 403/387 |
| 3,003,735 A | * | 10/1961 | Havener | 248/228.7 |
| 3,350,830 A | * | 11/1967 | Smith, Jr. et al. | 52/509 |
| 3,463,432 A | * | 8/1969 | Ptak | 248/228.7 |
| 3,599,921 A | * | 8/1971 | Cumber | 248/317 |
| 3,707,819 A | | 1/1973 | Calhoun et al. | |
| 3,808,763 A | | 5/1974 | Ollinger et al. | |

(Continued)

FOREIGN PATENT DOCUMENTS

WO    00/63507    10/2000

OTHER PUBLICATIONS http://www.rotofast.com/peopleSay.htm—Anchors Home, p. 1; Anchors Featurs and Benefits, p. 1; Anchors Product Specifications, p. 1&2; Anchors Wall Installations Plus Clouds, p. 1; Anchors Wall Installations Plus Ceilings, p. 1; Anchors Features and Benefits, p. 1; Anchors How Rotofast Works, p. 1&2; Anchors Installation Instructions, p. 1&2; Anchors Orders and Inquiries, p. 1.

(Continued)

*Primary Examiner* — Brian Glessner
*Assistant Examiner* — Joshua Ihezie

(57) ABSTRACT

An up-tight surface covering system for attaching a facing of a panel member to a support structure comprises an adjustable hanger bracket for attaching a grid member to the support structure and a clip for attaching the panel member to the grid member. The adjustable hanger bracket comprises an arm rotatably attached to a support. The arm includes a first section extending substantially parallel to the support and a second section extending substantially perpendicular to the support. The second section has at least one slot for receiving a mechanical fixing member. The clip comprises a main body portion having an attachment member extending from a substantial center thereof. The main body portion has engagement members extending from opposing sides of the main body portion and substantially perpendicular thereto. The engaging members have abutment members extending from side surfaces thereof substantially perpendicular to the main body portion and the engaging members.

14 Claims, 8 Drawing Sheets

U.S. PATENT DOCUMENTS

| | | | |
|---|---|---|---|
| 3,828,508 A | 8/1974 | Moeller | |
| 3,832,816 A * | 9/1974 | Jahn | 52/779 |
| 3,843,086 A * | 10/1974 | Ptak | 248/317 |
| 3,984,959 A | 10/1976 | Wasson | |
| 4,048,777 A | 9/1977 | Carroll | |
| 4,095,385 A * | 6/1978 | Brugman | 52/506.08 |
| 4,191,352 A * | 3/1980 | Schuplin | 248/317 |
| 4,549,375 A * | 10/1985 | Nassof | 52/39 |
| 4,761,922 A * | 8/1988 | Black | 52/71 |
| 4,763,456 A | 8/1988 | Giannuzzi | |
| 4,838,002 A * | 6/1989 | Dajnko et al. | 52/475.1 |
| 4,852,324 A * | 8/1989 | Page | 52/506.02 |
| 5,125,200 A | 6/1992 | Natterer | |
| 5,201,787 A * | 4/1993 | LaLonde et al. | 52/506.06 |
| 5,417,050 A * | 5/1995 | Cosentino | 52/506.08 |
| 5,634,308 A | 6/1997 | Doolan | |
| 5,636,488 A * | 6/1997 | Lawrence et al. | 52/521 |
| 5,758,465 A * | 6/1998 | Logue | 52/506.06 |
| 5,930,965 A | 8/1999 | Carver | |
| 5,974,753 A * | 11/1999 | Hsu | 52/506.01 |
| 6,098,364 A * | 8/2000 | Liu | 52/506.08 |
| 6,205,730 B1 * | 3/2001 | Hasan et al. | 52/408 |
| 6,324,807 B1 * | 12/2001 | Ishiko | 52/506.01 |
| 6,360,507 B1 * | 3/2002 | Nevers et al. | 52/506.07 |
| 6,464,179 B1 * | 10/2002 | Bulvan et al. | 248/58 |
| 6,634,151 B1 | 10/2003 | Roth | |
| 6,637,710 B2 * | 10/2003 | Yaphe et al. | 248/317 |
| 6,935,083 B2 * | 8/2005 | Chezum | 52/511 |
| 6,971,210 B2 * | 12/2005 | Kliegle et al. | 52/506.07 |
| 6,973,756 B2 * | 12/2005 | Hatzinikolas | 52/235 |
| 7,013,613 B1 | 3/2006 | Boellner et al. | |
| 7,104,018 B2 | 9/2006 | Romes et al. | |
| 7,121,052 B2 * | 10/2006 | Niese et al. | 52/403.1 |
| 7,516,585 B2 * | 4/2009 | Lehane et al. | 52/506.07 |
| 7,594,368 B2 * | 9/2009 | Kurz | 52/290 |
| 7,690,168 B2 * | 4/2010 | LaLonde | 52/506.08 |
| 2004/0134312 A1 | 7/2004 | Hodges | |
| 2004/0144049 A1 * | 7/2004 | Burken et al. | 52/506.01 |
| 2004/0221535 A1 * | 11/2004 | Hatzinikolas | 52/506.06 |
| 2005/0178244 A1 * | 8/2005 | Hodges | 81/27 |
| 2006/0230697 A1 | 10/2006 | Lupton | |
| 2007/0000198 A1 | 1/2007 | Payne et al. | |
| 2007/0228236 A1 | 10/2007 | MacKay et al. | |

OTHER PUBLICATIONS

Cooper B-Line Product Catalogue—pp. 60-77.

* cited by examiner

UP-TIGHT SURFACE COVERING AND ATTACHMENT SYSTEM

CROSS-REFERENCE TO RELATED APPLICATIONS

This application claims priority from U.S. Patent Application Ser. No. 61/069,866, filed Mar. 18, 2008, the disclosure of which is hereby incorporated herein by reference in its entirety.

FIELD OF THE INVENTION

The present invention relates to the art of surface covering systems and, more specifically, to an attachment system for attaching a facing of a surface covering up tight to an underlying support structure.

BACKGROUND OF THE INVENTION

A conventional surface covering system in an interior building environment includes a plurality of grid members, which are suspended from a building infrastructure to form a support framework. Panel members, such as acoustical fiberboard panels, are typically placed into, and are supported by, the support framework. Recent building trends, however, have been moving away from this type of conventional surface covering system. Specifically, surface covering systems have evolved to include the ability to mount open ceilings (e.g., open plenums) and suspended ceilings in areas where the height of the surface covering system needs to be minimized. For example, one known solution is to mount the panel members to an underside of the support framework, for example, through a clip attached to the support framework. The clip may be for example, a scissor clip having a base with mechanically moveable arms that are rotated from an open position to a closed position to lock the clip onto the support framework. Alternatively, the clip may have arms formed from folded end portions of the clip whereby the clip is rotated about the support framework to engage the arms with the support framework to lock the clip thereto.

Because the aforementioned clips require operating moving elements or rotating the clip about the support framework in order to attach the clips to the support framework, the clips are difficult to install and installation errors are thereby more likely. It is therefore desirable to develop an attachment system for attaching a panel member to a support structure wherein the attachment member is easy to install and errors in installation are less likely.

BRIEF SUMMARY OF THE INVENTION

The present invention relates to an attachment system for attaching a facing of a panel member to a support structure. The attachment system comprises an adjustable hanger bracket including an arm rotatably attached to a support. The arm includes a first section extending substantially parallel to the support and a second section extending substantially perpendicular to the support. The second section has at least one slot for receiving a mechanical fixing member.

The present invention further relates to an attachment system for attaching a facing of a panel member to a support structure. The attachment system comprises a clip with a main body portion having an attachment member extending from a substantial center thereof. The main body portion has engagement members extending from opposing sides of the main body portion and substantially perpendicular thereto. Each of the engaging members has an abutment member extending from a side surface thereof. The abutment members extend substantially perpendicular to the main body portion and the engaging members.

The present invention still further relates to an up-tight surface covering system for attaching a facing of a panel member to a support structure comprising an adjustable hanger bracket for attaching a grid member to the support structure and a clip for attaching the panel member to the grid member. The adjustable hanger bracket comprises an arm rotatably attached to a support. The arm includes a first section extending substantially parallel to the support and a second section extending substantially perpendicular to the support. The second section has at least one slot for receiving a mechanical fixing member. The clip comprises a main body portion having an attachment member extending from a substantial center thereof. The main body portion has engagement members extending from opposing sides of the main body portion and substantially perpendicular thereto. Each of the engaging members has an abutment member extending from a side surface thereof. The abutment members extend substantially perpendicular to the main body portion and the engaging members.

DETAILED DESCRIPTION OF THE EMBODIMENT(S)

Figure 1:
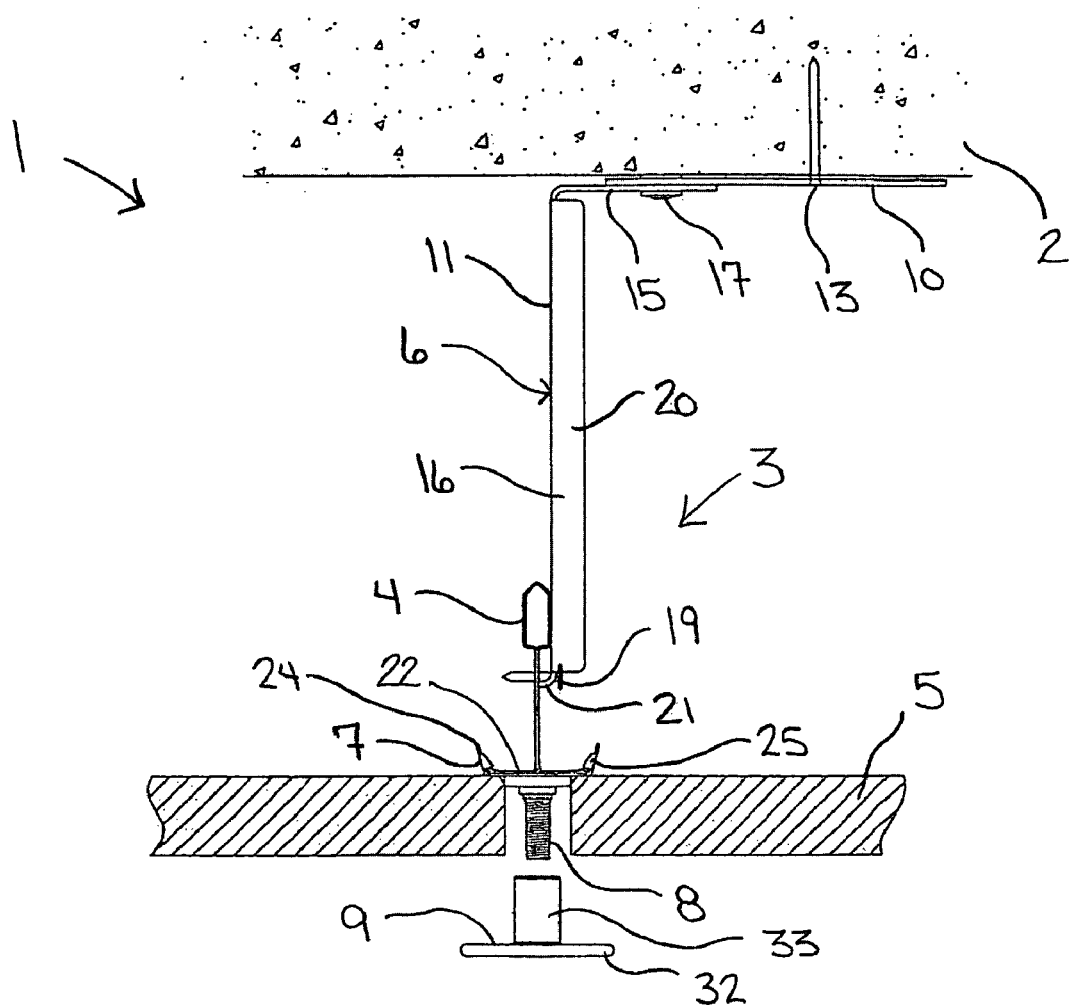
FIG. 1 is a partial sectional schematic illustration of a surface covering system according to an embodiment of the present invention.

FIG. 1 shows an up-tight surface covering system 1 according to an embodiment of the present invention. As shown in FIG. 1, the surface covering system 1 comprises a support structure 2, an attachment system 3, at least one grid member 4, and at least one panel member 5. In the surface covering system 1, the attachment system 3 mounts the grid members 4 of a support framework to the support structure 2 and mounts the panel members 5 to the support framework formed by the grid members 4. In the embodiment shown and described herein, the surface covering system 1 is an acoustical sub-ceiling wherein the support structure 2 is an overhead building infrastructure. However, it will be appreciated by those skilled in the art that the surface covering system 1 can be utilized on various other interior building surfaces, such as walls.

Figure 2:
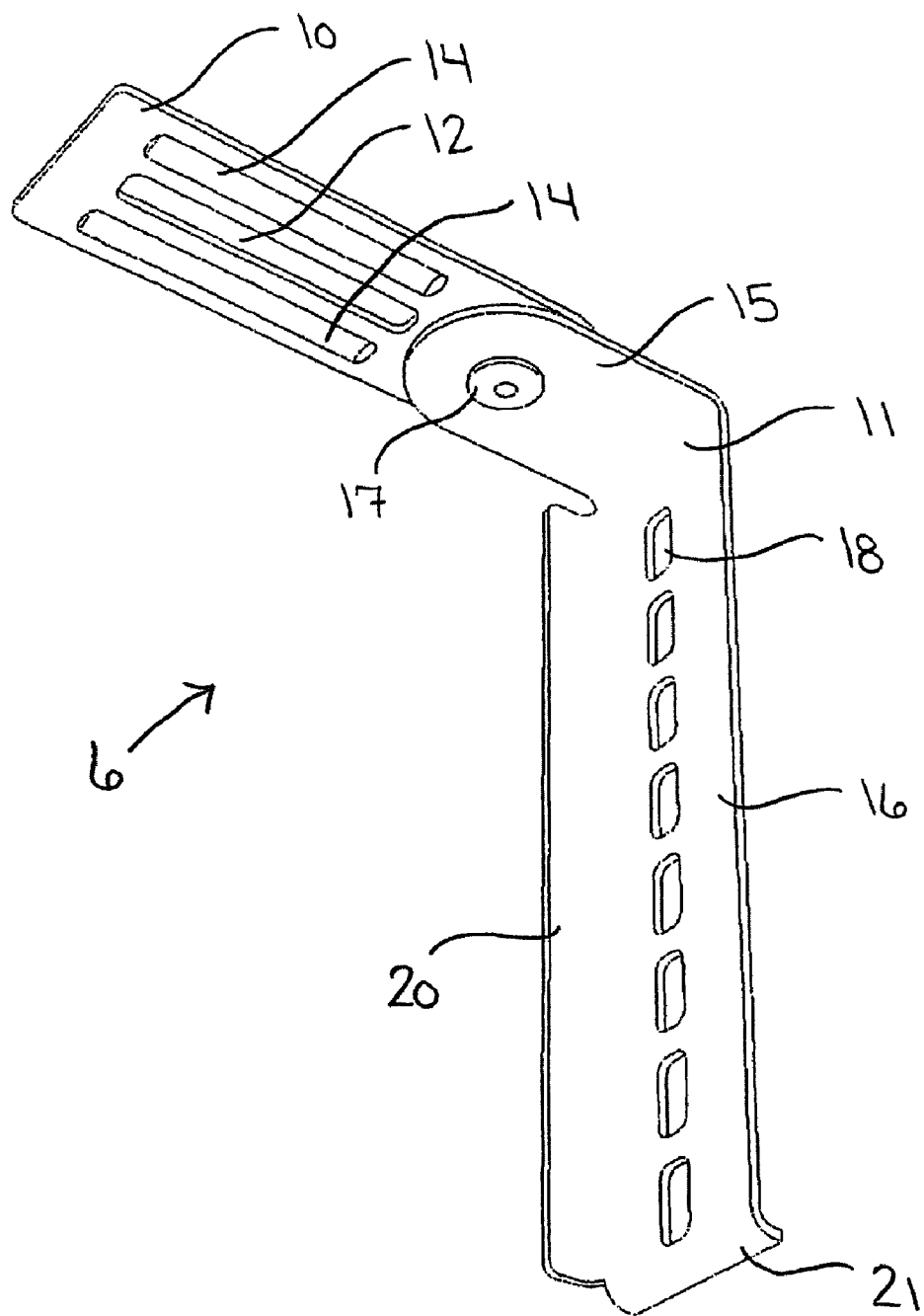
FIG. 2 is a perspective view of an adjustable hanger bracket of an attachment system of the surface covering system of FIG. 1.
Figure 3:
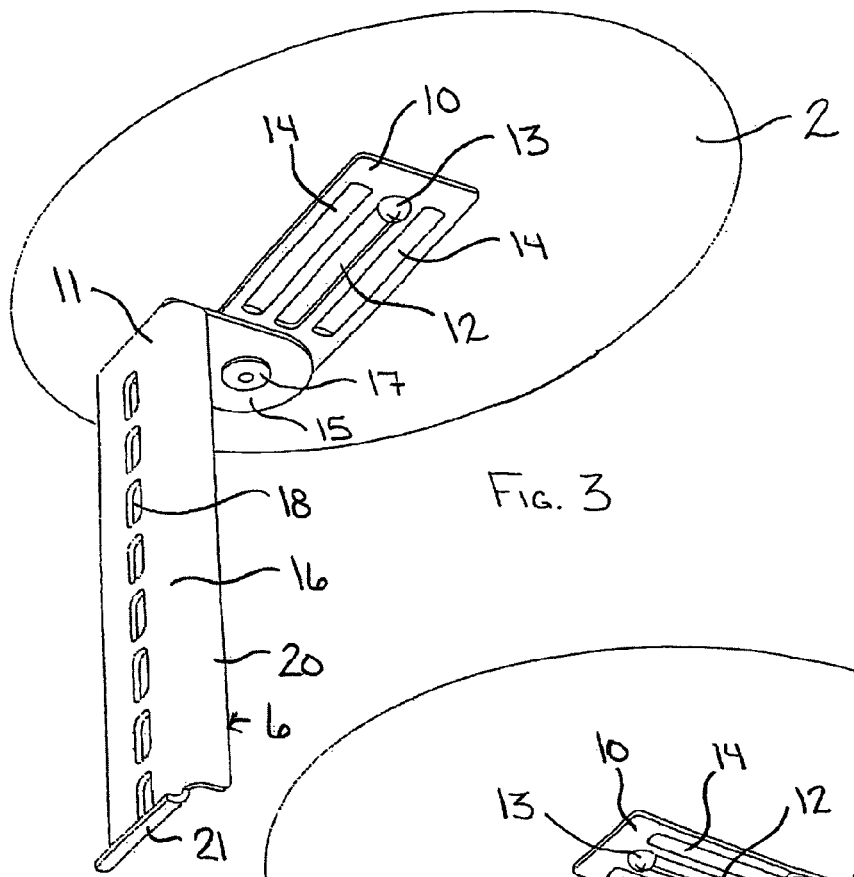
FIG. 3 is a perspective view of the adjustable hanger bracket of the attachment system of the surface covering system of FIG. 1 shown in a rotated position.
Figure 4:
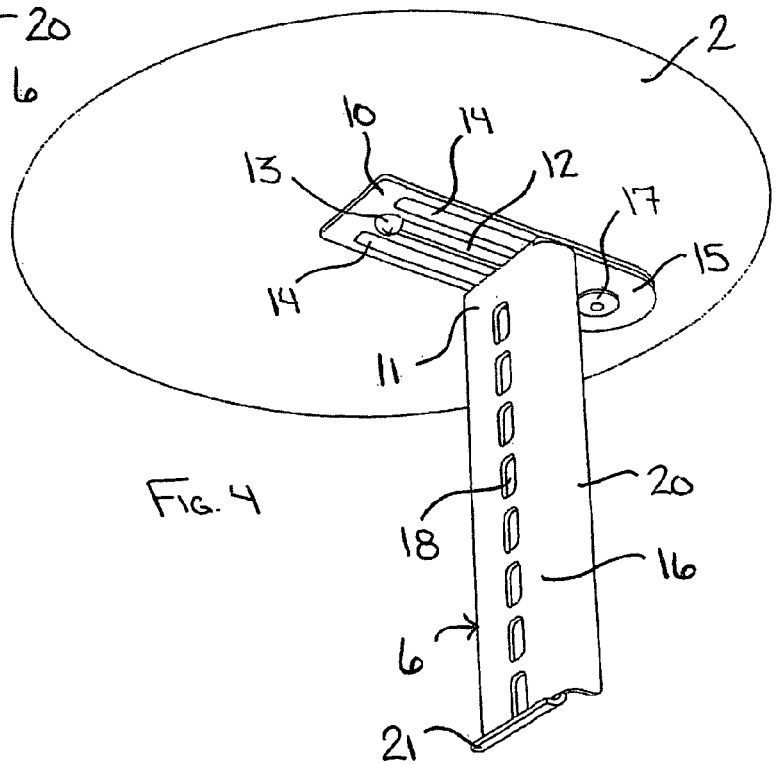
FIG. 4 is a perspective view of the adjustable hanger bracket of the attachment system of the surface covering system of FIG. 1 shown in a further rotated position.

As shown in FIG. 1, the attachment system 3 comprises an adjustable hanger bracket 6, a clip 7 provided with an attachment member 8, and a cap 9. As shown in FIGS. 1-2, the adjustable hanger bracket 6 is a multi-component bracket including a support 10 and an arm 11. The support 10 is a substantially elongated metal plate provided with at least one longitudinally extending slot 12 and an aperture (not shown). The slot 12 is configured to receive at least one mechanical fixing member 13, such as a screw or a nail, for mounting the support 10 to the support structure 2. The mechanical fixing member 13, for example, can be inserted through the slot 12 in the support 10 and into the support structure 2. Optionally, one or more longitudinally extending ribs 14 may be formed on opposite sides of the slot 12. The ribs 14 may be formed, for example, by stamping.

As shown in FIGS. 1-4, the configuration of the slot 12 allows for horizontal adjustability of the support 10 by enabling the mechanical fixing member 13 to be received in the slot 12 at various locations depending on the desired positioning of the adjustable hanger bracket 6. Alternatively, the support 10 could be formed to have a plurality of apertures instead of the slot 12 to achieve substantially the same result. The ribs 14 provide structural integrity as well as clearance for a mechanical fastener 17 (described below), which attaches the support 10 to the arm 11. The adjustability of the support 10 relative to the support structure 2 allows an installer to easily correct misalignments of any of the components of the surface covering system 1 should the installer's, measurements be incorrect when installing any of the components of the surface covering system 1.

As shown in FIG. 2, the arm 11 includes a first section 15 extending substantially parallel to the support 10 and a second section 16 extending substantially perpendicular to the first section 15 and the support 10. The arm 11 may be constructed from, for example, a metal plate. The first section 15 is provided with an aperture (not shown) corresponding to the aperture (not shown) in the support 10. The first section 15 is rotatably attached to the support 10 by the mechanical fastener 17 that extends through the apertures (not shown) in the first section 15 and the support 10. The mechanical fastener 17 may be, for example, a rivet, threaded fastener, or the like. The first section 15 is preferably attached to the support 10 such that the arm 11 is capable of rotating up to 360 degrees about a longitudinal axis of the arm 11 relative to the support 10, as shown in FIGS. 1-4. The adjustability of the arm 11 relative to the support 10 allows the installer to easily correct misalignments of any of the components of the surface covering system 1 should the installer's measurements be incorrect when installing any of the components of the surface covering system 1.

As shown in FIG. 2, the second section 16 is provided with a plurality of slots 18 extending in a longitudinal direction of the arm 11. The slots 18 are configured to receive a mechanical fixing member 19 (FIG. 5) such as a screw, for mounting the second section 16 to the grid member 4 (described below). The second section 16 is provided with a plurality of the slots 18 so that the grid member 4 can be attached to the second section 16 of the arm 11 at varying heights. Optionally, first and second returns 20, 21 extend from the second section 16. For example, the first return 20 extends from a side of the second section 16 and substantially perpendicular thereto. The second return 21 extends from a bottom of the second section 16 and substantially perpendicular thereto. The first and second returns 20, 21 provide strength to the adjustable hanger bracket 6 thereby enabling the width of the second section 16 to be reduced. The second return 21 has a width corresponding to substantially ½ of a width of a bulb of the grid member 4 (described below).

Figure 5:
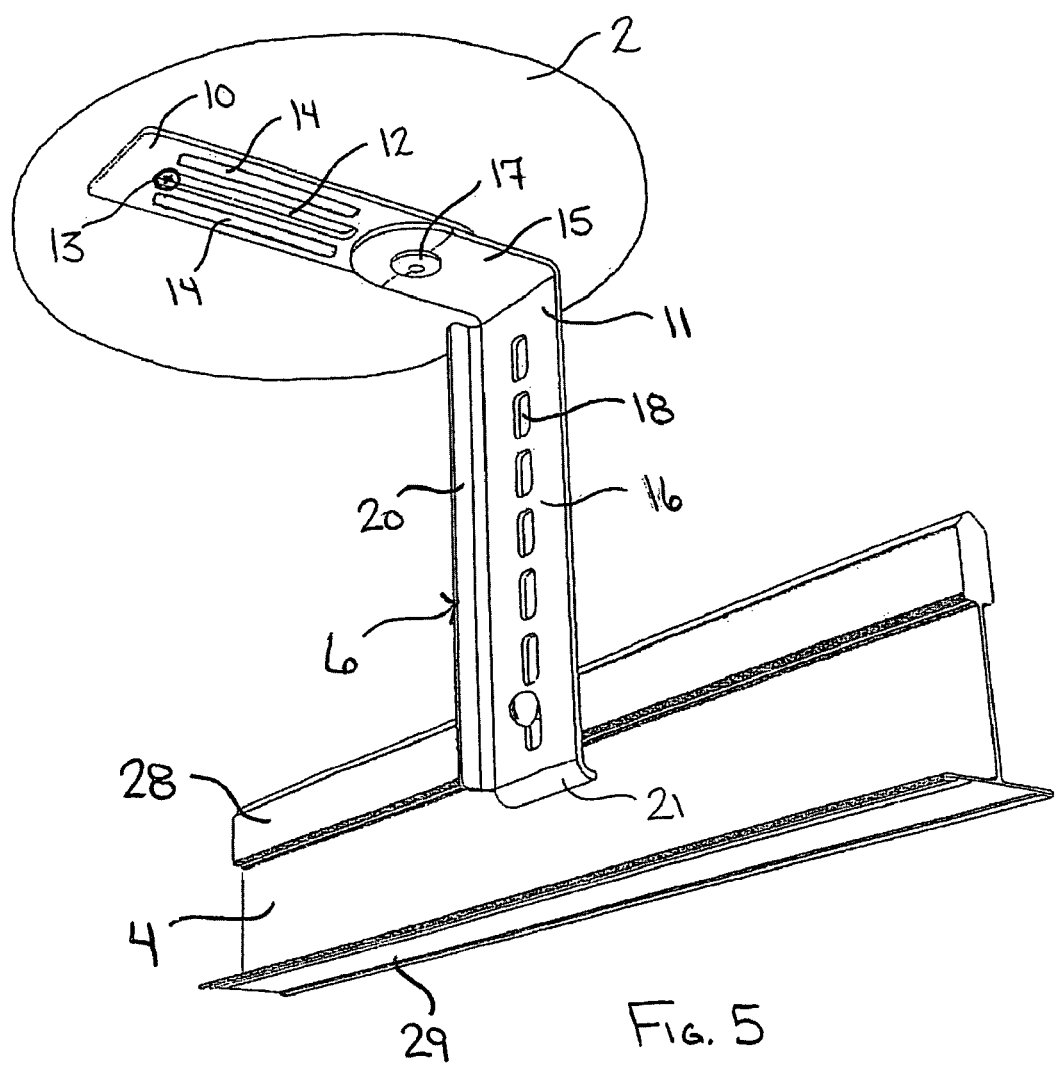
FIG. 5 is a perspective view of the adjustable hanger bracket mounted to a grid member of the attachment system of the surface covering system of FIG. 1.
Figure 12:
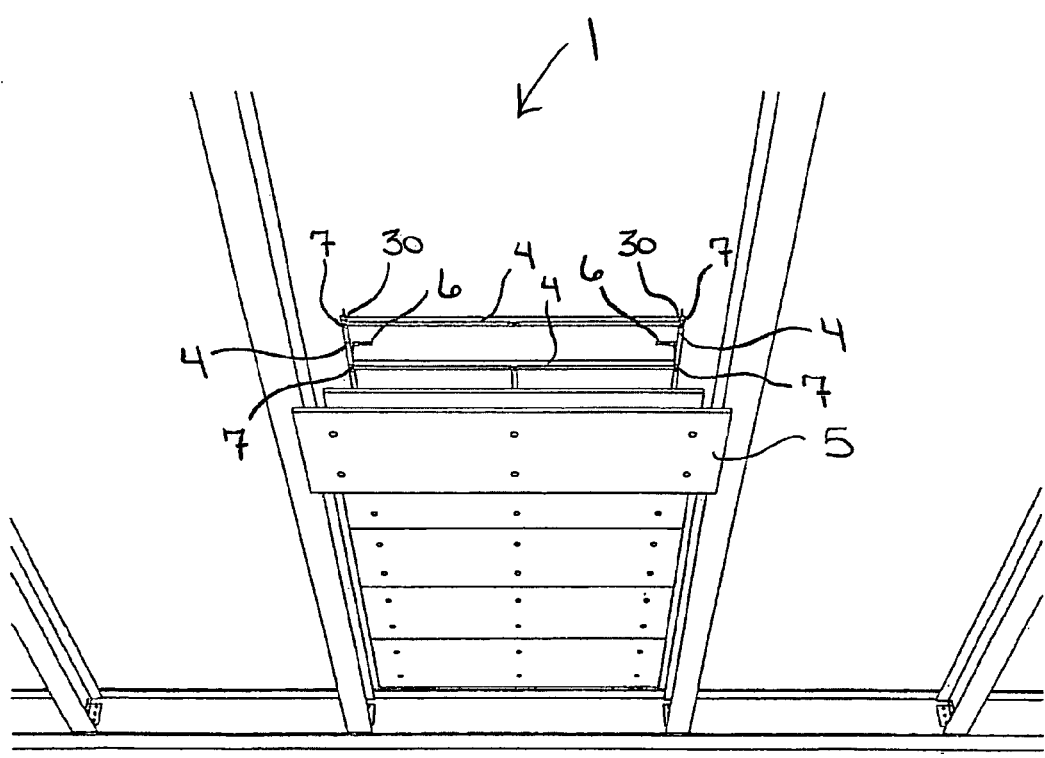
FIG. 12 is a partial exploded schematic illustration of the surface covering system of FIG. 1.

As shown in FIGS. 5 and 12, each of the adjustable hanger brackets 6 mounts at least one of the grid members 4 to the support structure 2. The grid member 4 comprises a base 28 having an extension member 29 extending there from and substantially perpendicular thereto. The extension member 29 has the bulb formed on an end thereof opposite from the base 28. The grid member 4 may be, for example, a metal beam, such as an I-beam or inverted-T beam similar to the 15/16 inch inverted-T grid members available from Armstrong World Industries, Inc. The grid members 4 are attached to the second section 16 of the arm 11 of the adjustable hanger bracket 6 such that a distal end of the second return 21 engages the extension member 29. The mechanical fixing member 19 is then inserted through one of the slots 18 in the second section 16 and into the extension member 29 of the grid member 4 to fix the adjustable hanger bracket 6 to the grid member 4. The second return 21 compensates for the bulb offset thereby enabling the second section 16 of the arm 11 to extend substantially parallel to the extension member 29. In the illustrated embodiment, the grid members 4 are mounted to the support structure 2 to form a grid-like support framework of substantially parallel grid members 4.

Figure 6:
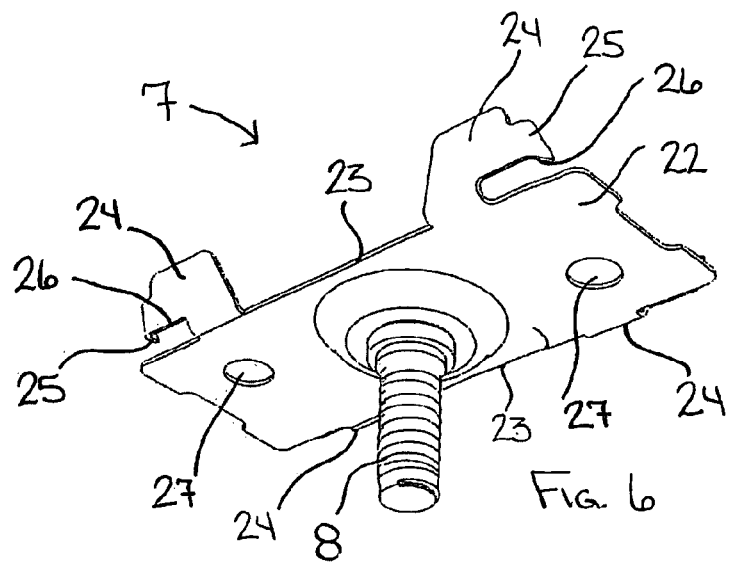
FIG. 6 is a perspective view of a clip of the attachment system of the surface covering system of FIG. 1.
Figure 7:
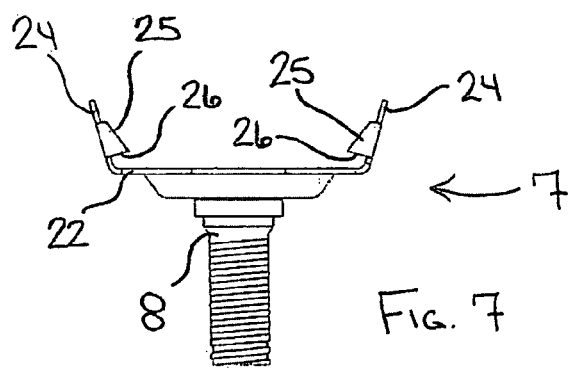
FIG. 7 is an elevational view of the clip of the attachment system of the surface covering system of FIG. 1.
Figure 8:
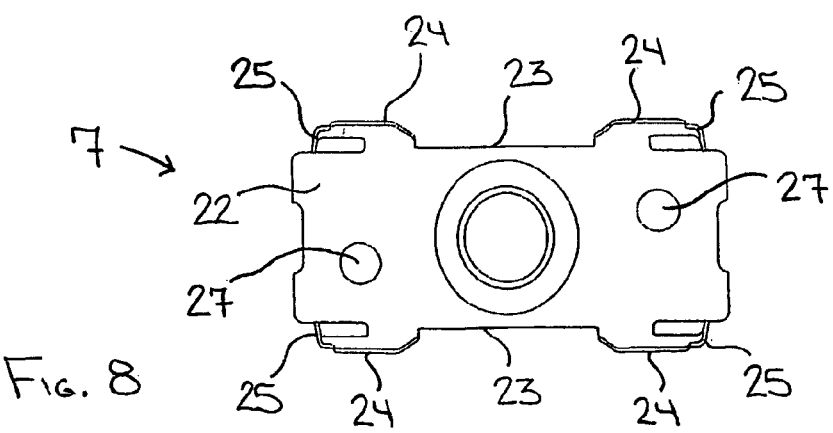
FIG. 8 is a plan view of the clip of the attachment system of the surface covering system of FIG. 1.

As shown in FIGS. 6-8, the clip 7 comprises a main body portion 22 and the attachment member 8. The main body portion 22 is a substantially rectilinear plate constructed of, for example, a metal, such as a resiliently rigid spring steel. The main body portion 22 may be formed, for example, by stamping from a single sheet of metal. Engagement members 24 having a substantially L-shape extend from opposing sides 23 of the main body portion 22 proximate corners thereof. The engagement members 24 are formed from the main body portion 22 and extend substantially perpendicular thereto. In a preferred embodiment, the engagement members 24 extend at a slight inclination away from the main body portion 22. Each of the engagement members 24 has an abutment member 25 extending from a side surface thereof. The abutment members 25 are formed from the engagement members 24 and extend substantially perpendicular to the main body portion 22 and the engagement members 24. Each of the abutment members 25 has an abutment surface 26 on a bottom surface thereof between the bottom surface of the abutment member 25 and the main body portion 22 that extends substantially parallel to the main body portion 22. Bends (not shown) may optionally be provided in the main body portion 22. The bends (not shown) may extend, for example, substantially parallel to a direction of width of the main body portion 22 between opposing engagement members 24 such that the engagement members 24 on opposite sides of the main body portion 22 are inclined slightly closer toward each other.

The attachment member 8 extends from a substantial center of the main body portion 22 substantially perpendicular thereto. The attachment member 8 may be, for example, a threaded stud or other member capable securely attaching the panel member 5 to the clip 7 (described below). The attachment member 8 may be, for example, attached to the clip 7 by a compression fit. Openings 27 are formed in the main body portion 22 on opposite sides of the attachment member 8. The openings 27 are configured to a optionally mechanical fixing member (not shown), such as a screw.

Figure 9:
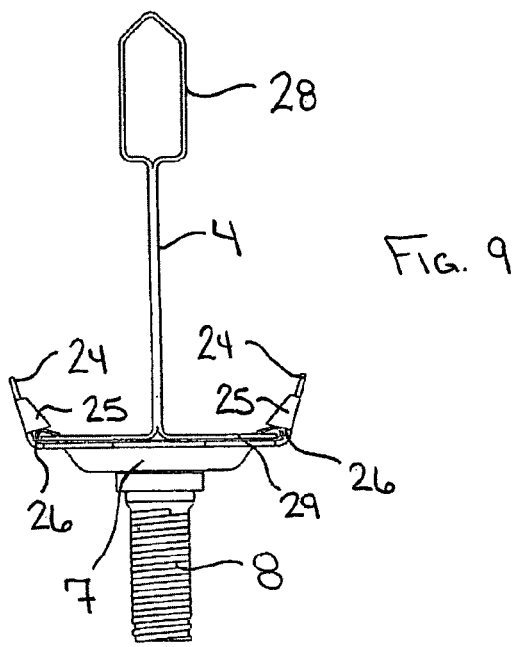
FIG. 9 is an elevational view of the clip mounted to the grid member of the attachment system of the surface covering system of FIG. 1.
Figure 10:
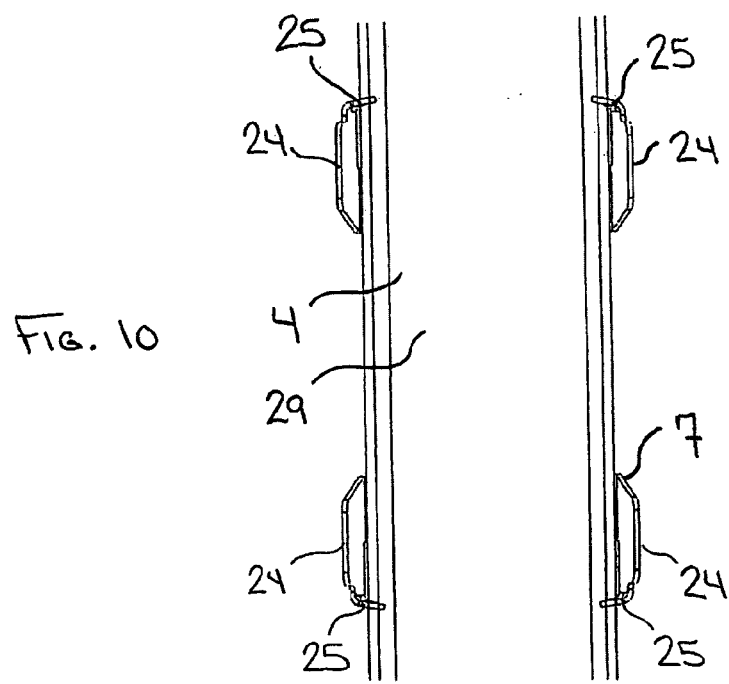
FIG. 10 is a plan view of the clip mounted to the grid member of the attachment system of the surface covering system of FIG. 1.

As shown in FIGS. 9-10, the clip 7 is attached to the grid member 4 such that the main body portion 22 extends substantially parallel to the base 28 of the grid member 4. The clip 7 can be easily and quickly attached to the grid member 4 by pressing the main body portion 22 of the clip 7 toward the base 28 of the grid member 4 until the engagement members 24 and the abutment members 25 resiliently snap onto the outer edge of the base 28 of the grid member 4 to frictionally engage the grid member 4. Thus, unlike the clips of the prior art, due to the configuration and resilient nature of the engagement members 24 and the abutment members 25 it is not necessary to manually operate moving elements or otherwise rotate the clip 7 to attach the clip 7 to the base 28 of the grid member 4. The abutment surfaces 26 of the abutment members 25 firmly engage an outer edge of the base 28 of the grid member 4 in such a manner that the abutment members 25 prevent the clip 7 from inadvertently becoming detached from the grid member 4, for example, when attaching the cap 9 to the attachment member 8 (described below). After attaching the clip 7 to the grid member 4, the mechanical fastening members (not shown) may optionally be inserted through the openings 27 in the main body portion 22 of the clip 7 and into the base 28 of the grid member 4 to further secure the clip 7 to the base 28 of the grid member 4. Although the clip 7 is shown and described herein with the main body portion 22 being in direct contact with the base 28, in a preferred embodiment, a slight gap (not shown) may be formed between the main body portion 22 and the base 28 due to the resiliency of the material of the clip 7 and/or due to the bends (not shown) provided in the clip 7 thereby further strengthening the engagement of the abutment surfaces 26 of the abutment members 25 with the outer edge of the base 28 of the grid member 4.

Figure 11:
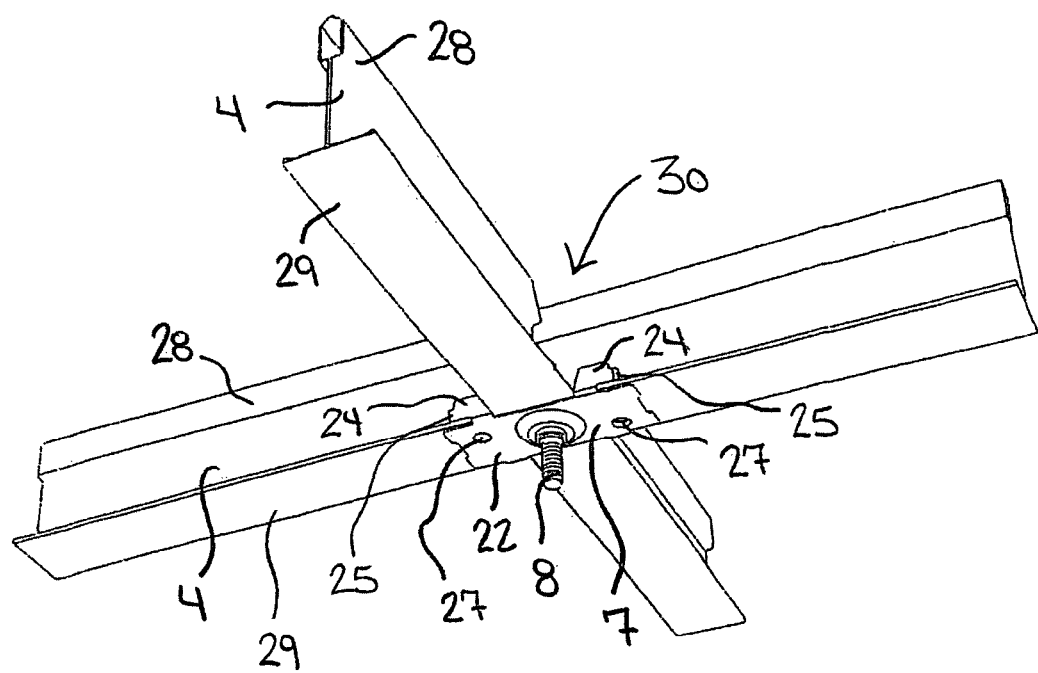
FIG. 11 is a perspective view of the clip mounted to the grid member of the attachment system of the surface covering system of FIG. 1 at a point of intersection of two of the grid members.

As shown in FIGS. 11-12, due to the configuration of the clip 7, the clip 7 can be readily attached to the grid members 4 at a point of intersection 30 of two of the grid members 4. Specifically, the clip 7 is attached to the grid member 4 such that the grid member 4 that intersects the grid member 4 on which the clip 7 is attached is arranged between the engagement members 24 and the abutment members 25 of the clip 7. By attaching the clips 7 at the point of intersection 30, the need to hand measure the spacing between adjacent clips 7 is eliminated thereby greatly reducing error in the hand registry and/or alignment of the panel members 5 relative one another (described below). Additionally, by attaching the clip 7 at the point of intersection 30, the grid member 4 that intersects the grid member 4 on which the clip 7 is attached can prevent the clip 7 from sliding or otherwise moving with respect to the grid member 4 thereby further reducing errors during assembly.

As shown in FIG. 1, the cap 9 includes a head 32 and a shaft 33. The head 32 has a larger circumference than the shaft 33. The shaft 33 has an internal circumference corresponding to an external circumference of the attachment member 8 so that the stem 33 is capable of mating with the attachment member 8. The stem 33 may be provided, for example, with internal threads (not shown) configured for engagement with the attachment member 8. The cap may be constructed, for example, of a plastic or metal material.

As shown in FIGS. 1 and 12, the clip 7 and the cap 9 mount the panel members 5 to the support structure 2. The panel members 5 may be, for, example, acoustical fiberboard-panels, ceiling tiles, wall panels, or the like. Each of the panel members 5 is provided with at least one through-hole 31 corresponding to the attachment member 8 of the clip 7. By inserting the attachment member 8 of the clip 7 into the through-hole 31 of the panel member 5 and thereafter attaching the cap 9 to the attachment member 8, a facing of the panel member 5 is attached to and supported by the attachment system 3. Optionally, the though-holes 31 may contain a bushing (not shown) therein in order to reinforce the panel member 5 when the attachment member 8 of the clip 7 and the cap 9 are fixed together. In turn, the panel members 5 will cover, at least substantially, the support framework formed by the grid members 4.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An attachment system for attaching a facing of a panel member to a support structure, comprising:
   an adjustable hanger bracket comprising an arm rotatably attached to a support, the arm including a first section extending substantially parallel to the support and a second section extending substantially perpendicular to the support, the second section having at least one slot for receiving a mechanical fixing member, and
   wherein the arm is rotatable up to 360 degrees about a longitudinal axis of the arm relative to the support,
   wherein the support and the arm are separate metal plates, and
   wherein the second section include a first return and a second return, the first return extending from a side of the second section and substantially perpendicular thereto, and the second return extending from a bottom of the second section and substantially perpendicular thereto.

2. The attachment system of claim 1, wherein the support includes at least one longitudinally extending slot for receiving at least one mechanical fixing member.

3. The attachment system of claim 1, wherein the support includes at least one longitudinally extending rib.

4. The attachment system of claim 1, wherein the support includes at least one longitudinally extending slot for receiving at least one mechanical fixing member for attachment to the support structure, and the attachment provides for horizontal adjustment of the support relative to the support structure.

5. An up-tight surface covering system for attaching a facing of a panel member to a support structure, comprising:
   an adjustable hanger bracket for attaching a grid member to the support structure, the adjustable hanger bracket comprising an arm rotatably attached to a support, the arm including a first section extending substantially parallel to the support and a second section extending substantially perpendicular to the support, the second section having at least one slot for receiving a mechanical fixing member; and
   a clip for attaching the panel member to the grid member, the clip comprising a main body portion having an attachment member extending from a substantial center thereof, the main body portion having engagement members extending from opposing sides of the main body portion and substantially perpendicular thereto, each of the engagement members having an abutment member extending from a side surface thereof, the abutment members extending substantially perpendicular to the main body portion and the engagement members, and wherein the arm is rotatable up to 360 degrees about a longitudinal axis of the arm relative to the support when the support is attached to the support structure, wherein the main body portion, the support, and the arm are separate metal plates, and wherein the second section include a first return and a second return, the first return extending from a side of the second section and substantially perpendicular thereto, and the second return extending from a bottom of the second section and substantially perpendicular thereto.

6. The up-tight surface covering system of claim 5, wherein the support includes at least one longitudinally extending slot for receiving at least one mechanical fixing member.

7. The up-tight surface covering system of claim 5, wherein the support includes at least one longitudinally extending rib.

8. The up-tight surface covering system of claim 5, wherein the engagement members are substantially L-shaped.

9. The up-tight surface covering system of claim 5, wherein the engagement members extend at an inclination away from the main body portion.

10. The up-tight surface covering system of claim 5, wherein the abutment members have an abutment surface on a bottom surface thereof between the bottom surface of the abutment members and the main body portion that extends substantially parallel to the main body portion.

11. The up-tight surface covering system of claim 5, wherein the engagement members are resilient.

12. The up-tight surface covering system of claim 5, further comprising a cap fixed to the attachment member for securing the panel member to the clip.

13. The up-tight surface covering system of claim 5, wherein the clip is attached to a base of the grid member at a point of intersection of two of the grid members.

14. The up-tight surface covering system of claim 5, wherein the mechanical fixing member received by the second section attaches to the grid member and the second section does not attach to the clip.

* * * * *